(12) United States Patent
Sakai et al.

(10) Patent No.: US 10,053,159 B2
(45) Date of Patent: Aug. 21, 2018

(54) CABIN SUPPORT DECK

(71) Applicant: KOBELCO CONSTRUCTION MACHINERY CO., LTD., Hiroshima-shi (JP)

(72) Inventors: Keiji Sakai, Hyogo (JP); Tomonori Nakashita, Hyogo (JP); Kiyotsuna Kuchiki, Hyogo (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 11 days.

(21) Appl. No.: 15/434,915

(22) Filed: Feb. 16, 2017

(65) Prior Publication Data

US 2017/0240218 A1 Aug. 24, 2017

(30) Foreign Application Priority Data

Feb. 23, 2016 (JP) ................................. 2016-032179

(51) Int. Cl.

| | |
|---|---|
| *B62D 33/06* | (2006.01) |
| *B66C 13/54* | (2006.01) |
| *E02F 9/16* | (2006.01) |
| *B62D 33/063* | (2006.01) |

(52) U.S. Cl.
CPC ............ *B62D 33/063* (2013.01); *B66C 13/54* (2013.01); *E02F 9/166* (2013.01)

(58) Field of Classification Search
CPC ................ B62D 33/06; B62D 33/0617; B62D 33/0621; B62D 33/063; B62D 33/067; B66C 13/54; E02F 9/16; E02F 9/166

USPC ............ 296/190.01, 190.04, 190.05, 190.08
See application file for complete search history.

(56) References Cited

U.S. PATENT DOCUMENTS

| | | | | |
|---|---|---|---|---|
| 4,451,079 A * | 5/1984 | Takahashi | ............ | B62D 33/067 180/89.13 |
| 2008/0284207 A1* | 11/2008 | Bollinger | ............. | B62D 21/152 296/190.05 |
| 2009/0314566 A1* | 12/2009 | Rust | ..................... | B62D 33/067 180/89.14 |
| 2010/0147603 A1* | 6/2010 | Davis | .................... | B60R 21/131 180/9.46 |
| 2015/0191895 A1* | 7/2015 | Shimomura | .......... | E02F 9/0883 280/830 |

(Continued)

FOREIGN PATENT DOCUMENTS

JP 2007-290798 11/2007

*Primary Examiner* — Gregory A Blankenship
(74) *Attorney, Agent, or Firm* — Oblon, McClelland, Maier & Neustadt, L.L.P.

(57) ABSTRACT

A cabin support deck for supporting a cabin of a construction machine on the underside of the cabin includes a frame member and a mounting portion. The frame member includes a proximal segment at which the frame member is supported, a distal segment, a left side segment, and a right side segment. The distal segment has a first structure having a first lateral dimension. The proximal segment has a second structure having a second lateral dimension which is greater than the first lateral dimension. At least one of the proximal side sections of the left side segment and the right side segment has the second structure, and the other portions of the left side segment and the right side segment have the first structure.

10 Claims, 6 Drawing Sheets

(56) References Cited

U.S. PATENT DOCUMENTS

2015/0233092 A1* 8/2015 Fujikawa .................. E02F 9/16
                                                                                          296/190.08
2017/0240218 A1* 8/2017 Sakai ................... B62D 33/063

* cited by examiner

CABIN SUPPORT DECK

TECHNICAL FIELD

The present invention relates to a cabin support deck.

BACKGROUND ART

For example, Japanese Unexamined Patent Publication No. 2007-290798 (hereinafter, referred to as "Patent Literature 1") discloses a cabin support deck which supports a cabin of a construction machine on the underside of the cabin as illustrated in FIGS. 5 and 7. The cabin support deck described in Patent Literature 1 has a configuration in which a proximal portion of the support deck is supported to a machine body.

With the cabin support deck, for example, a weight reduction is likely to lead to a lack of necessary dynamic stiffness. To the contrary, an increase of the thickness of the cabin support deck to enhance the dynamic stiffness is likely to lead to an increase of the weight of the cabin support deck.

SUMMARY OF INVENTION

An object of the present invention is to provide a cabin support deck which has a necessary dynamic stiffness at a reduced weight.

A cabin support deck according to one aspect of the present invention supports a cabin of a construction machine. The cabin support deck includes a proximal segment at which the frame member is supported, a distal segment arranged away from the proximal segment, a left side segment which connects a left end of the proximal segment and a left end of the distal segment with each other, and has a proximal side section and a distal side section, and a right side segment which connects a right end of the proximal segment and a right end of the distal segment with each other, and has a proximal side section and a distal side section: and a mounting portion fixedly attached to the frame member, and on which the cabin is to be mounted, wherein the distal segment has a first structure having a first lateral dimension, the proximal segment has a second structure having a second lateral dimension which is greater than the first lateral dimension, and at least one of the proximal side sections of the left side segment and the right side segment has the second structure, and the other portions including the distal side sections of the left side segment and the right side segment have the first structure.

DESCRIPTION OF EMBODIMENTS

Figure 1:
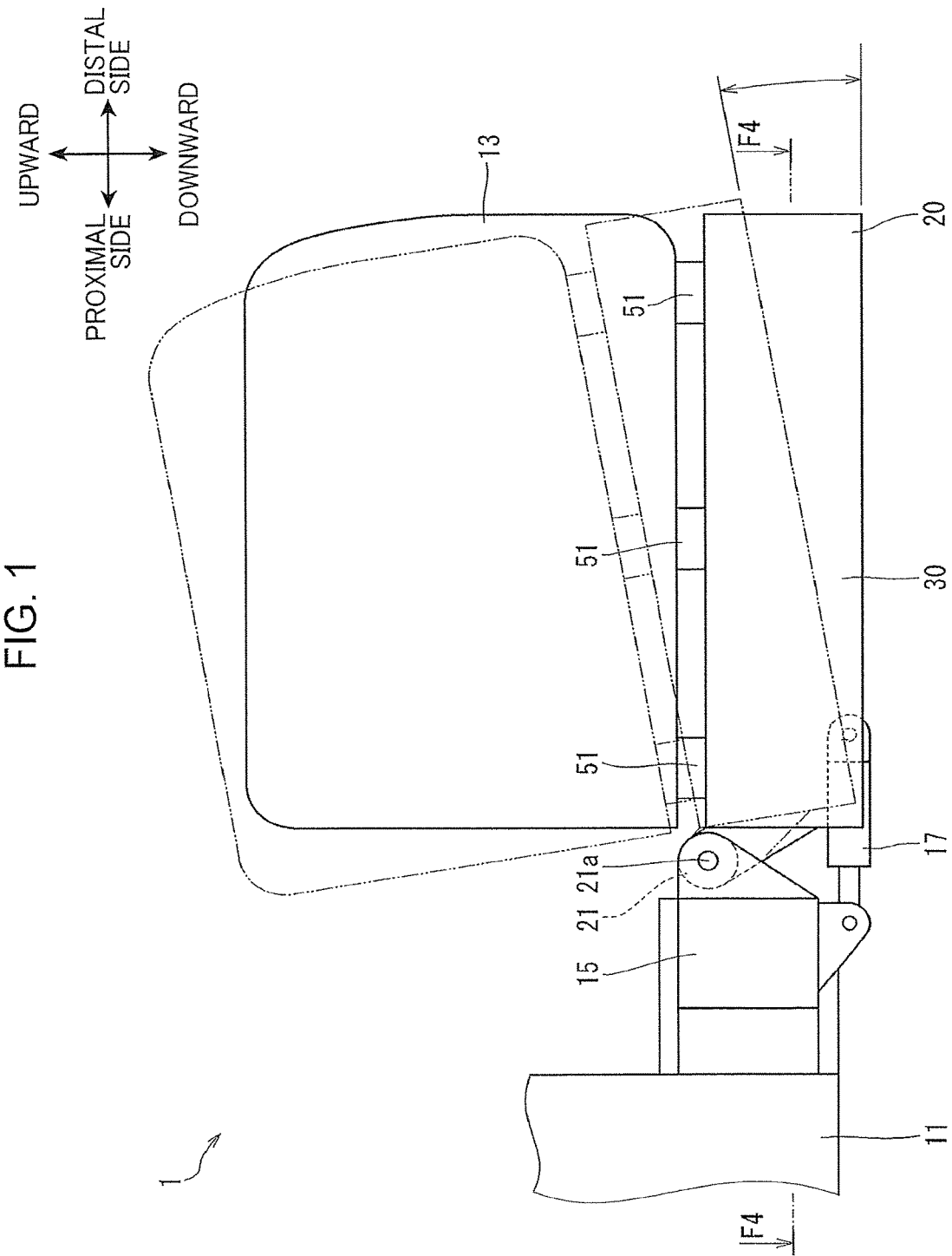
FIG. 1 is a side view showing an assembly of a cabin and a cabin support deck according to an embodiment of the present invention.

A construction machine 1 which is an embodiment of the present invention will be described with reference to FIGS. 1 to 4.

In this embodiment, the construction machine 1 is a crane or a movable crane. The construction machine 1 includes a slewing frame 11, a cabin 13, a swing arm 15 (see FIG. 2), and a driving device 17 in addition to the cabin support deck 20. The slewing frame 11 is slewable over a lower travelling body (not shown). The cabin 13 serves as an operator's compartment of the construction machine 1.

Figure 2:
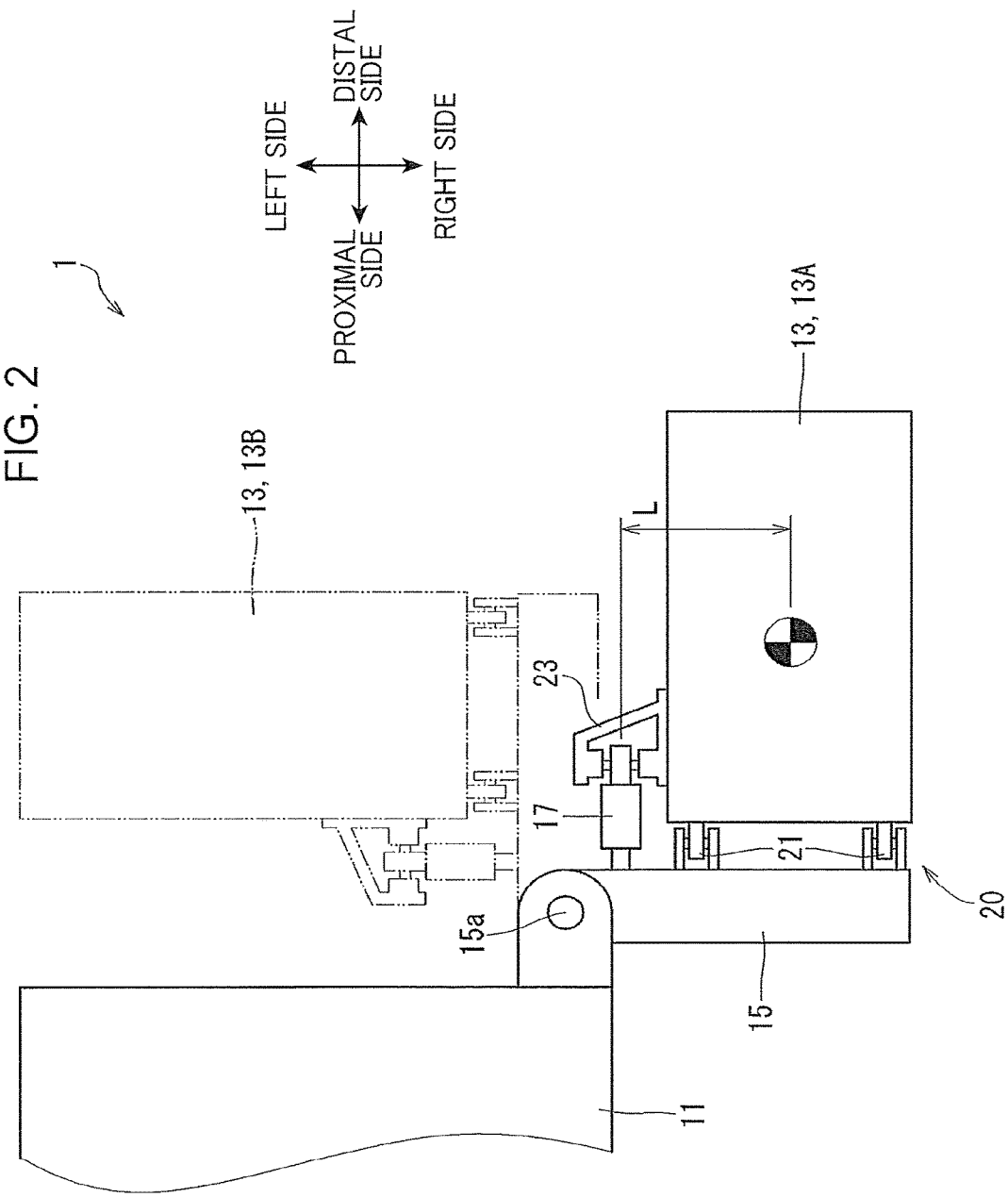
FIG. 2 is a plan view of the combination shown in FIG. 1.

As shown in FIG. 2, the swing arm 15 supports an assembly of the cabin 13 and the cabin support deck 20 pivotally about a shaft 15a extending in a vertical direction with respect to the swing frame 11. The shaft 15a is fixedly held to the slewing frame 11. The position of the cabin 13 to the slewing frame 11 is switched between an operation position 13A and a storage position 13B by a swing of the slewing arm 15 about the shaft 15a. For example, the operation position 13A represents a position of the cabin 13 at which the construction machine 1 is put into operation. The storage position 13B represents a position of the cabin 13 at which the cabin 13 is retracted to lie within the width of the slewing frame 11 for transport or the like.

The driving device 17 drives the assembly of the cabin 13 and the cabin support deck 20 to pivot about a shaft 21a extending in a right-left direction (widthwise direction) with respect to the swing arm 15 to tilt the assembly as shown in FIG. 1. This pivoting or tilting is performed to provide an operator with a sufficient field of view from the cabin 13, for example, to enable the operator to see a hoisting operation (not shown) easily from the cabin 13. The driving device 17 moves the assembly of the cabin 13 and the cabin support deck 20 upward. The driving device 17 is configured by a hydraulic cylinder (tilt cylinder). The driving device 17 may be configured by an electric motor or a hydraulic motor.

Figure 3:
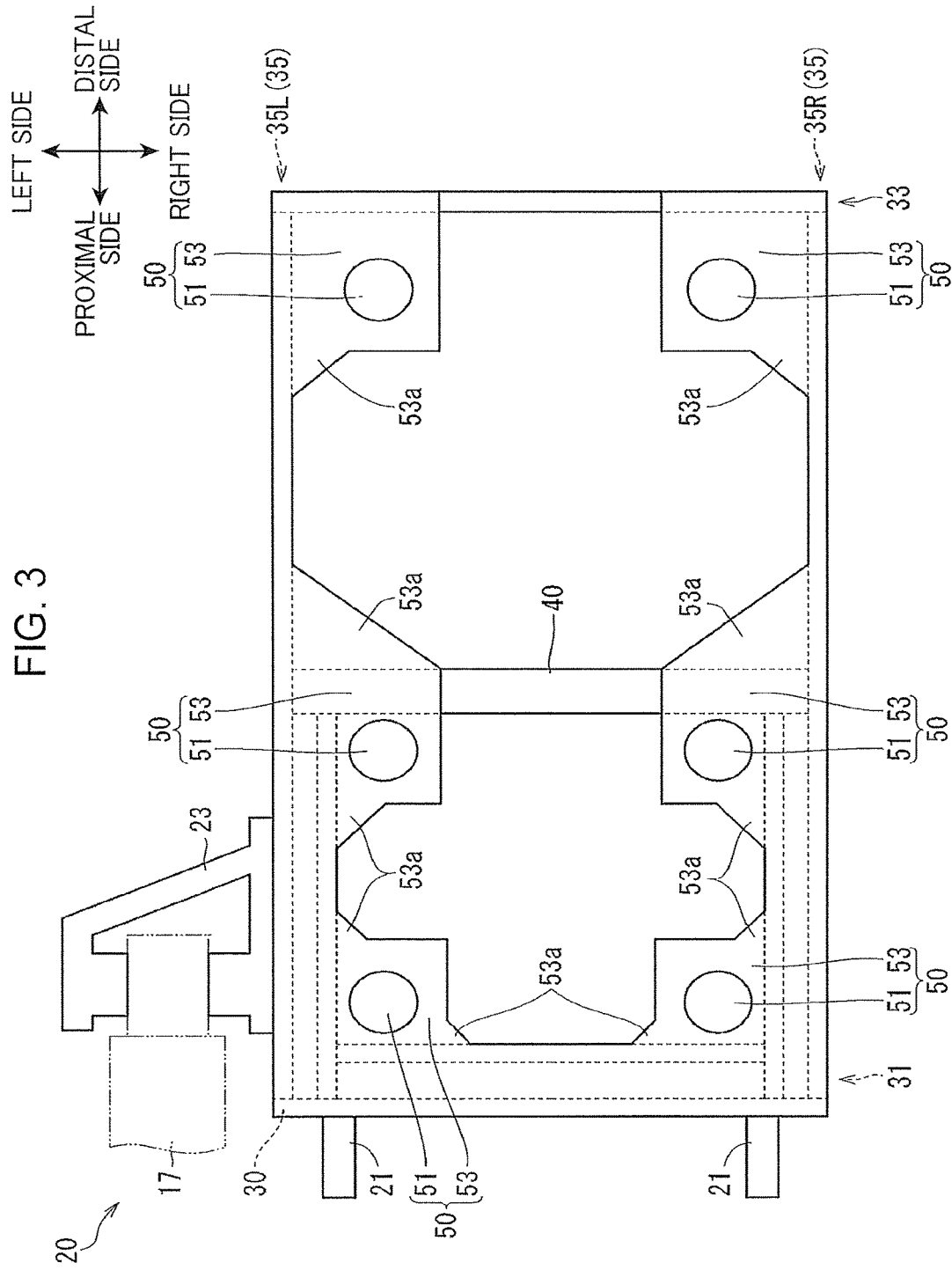
FIG. 3 is a plan view of the cabin support deck shown in FIG. 1.

The cabin support deck 20 supports the cabin 13 on the underside of the cabin 13. The cabin support deck 20 is supportively attached to the slewing frame 11 via the swing arm 15 and the driving device 17. A lengthwise direction of the cabin support deck 20 is along a forward and backward direction of the construction machine 1. In this embodiment, a lengthwise side of the cabin support deck 20 that is closer to the swing arm 15 is referred to as "proximal side", and an opposite side is referred to as "distal side". As shown in FIG. 2, the right-left direction which perpendicularly intersects the lengthwise direction is referred to as "widthwise direction". A widthwise side of the cabin support deck 20 where the driving device 17 is arranged is referred to as "left side", and the opposite side is referred to as "right side". Furthermore, each of FIGS. 1 and 2 shows the state where the cabin 13 is in the operation position 13A. The cabin support deck 20 includes a support bracket 21 and a driving device attachment member 23 as shown in FIG. 2. The cabin support deck 20 further includes a frame member 30 including: a proximal segment 31; a distal segment 33; and a left side segment 35L and a right side segment 35R, a connecting segment 40, and a mount member as shown in FIG. 3.

As shown in FIG. 1, the support bracket 21 supports the cabin support deck 20 pivotally about the shaft 21a extending in the widthwise direction with respect to the swing arm 15. The support bracket 21 protrudes from the proximal segment 31 of the frame member 30 toward the swing arm 15.

As shown in FIG. 2, the driving device attachment member 23 is connected with the driving device 17, specifically, the distal end of the driving device 17 such as a cylinder is attached to the driving device attachment member 23. As shown in FIG. 3, the driving device attachment member 23 is held by the frame member 30 by being fixedly disposed on a proximal side section of the left side segment 35L. In this embodiment, the driving device attachment member 23 protrudes leftward from the left side segment 35L of the frame member 30.

Figure 4:
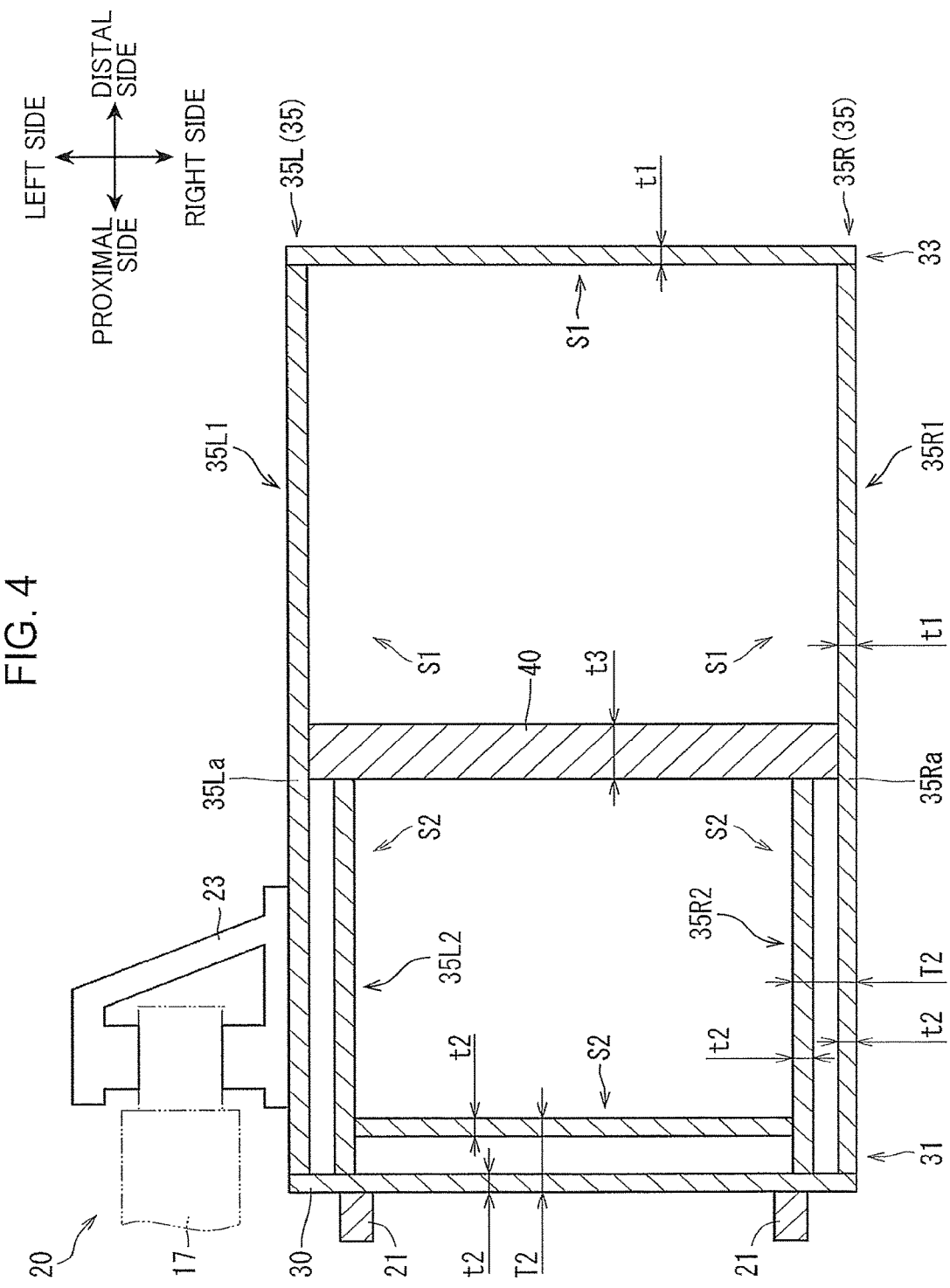
FIG. 4 is a cross sectional view of the cabin support deck, taken along a line F4-F4 shown in FIG. 1, and showing an arrangement of a frame member of the cabin support deck.

As shown in FIG. 4, the frame member 30 has a rectangular shape in the downward view. The frame member 30 is mounted on a machine body at the support bracket 21 and the driving device attachment member 23 which are arranged on the proximal side. The distal side of the frame member 30 has no support. In other words, the frame member 30 is supported on the proximal side in a cantilever manner. Each of the proximal segment 31, the distal segment 33, the left side segment 35L, and the right side segment 35R has a plate-like or substantially plate-like shape. The proximal segment 31 defines the proximal end of the frame member 30, and extends in the widthwise direction and the vertical direction. The distal segment 33 is arranged away from the proximal segment 31 on the distal side, and defines the distal end of the frame member 30. The distal segment 33 faces the proximal segment 31, and extends in the widthwise direction and the vertical direction. The left side segment 35L and the right side segment 35R connect the proximal segment 31 and the distal segment 33 with each other in the lengthwise direction. The left side segment 35L defines a left end of the frame member 30, and the right side segment 35R defines a right end of the frame member 30. The left side segment 35L connects a left end of the proximal segment 31 and a left end of the distal segment 33 with each other. The right side segment 35R connects a right end of the proximal segment 31 and a right end of the distal segment 33 with each other. The left side segment 35L and the right side segment 35R face each other in the widthwise direction. The left side segment 35L and the right side segment 35R extend in the lengthwise direction and the vertical direction. The frame member 30 has a first structure S1 and a second structure S2. The frame member 30 may consist of the first structure S1 and the second structure S2.

The first structure S1 is configured by a single plate and has no space defined by two or more plates, which is referred to as a single structure. The plate of the first structure S1 has a thickness (first lateral dimension) t1 which is, for example, uniform in the first structure S1. For example, the thickness t1 is 6 mm.

The second structure S2 has a lateral dimension (second lateral dimension) T2 which is greater than the lateral dimension (thickness t1) of the first structure S1. The second structure S2 includes a plurality of plates which are arranged to define a space therebetween. The plates of the second structure S2 are arranged at a given space with facing each other in the lateral dimensional direction of the second structure S2. Owing to the space defined between the plates, the second structure S2 has a higher torsional stiffness than a structure (or single structure) having no space defined between two or more plates. For example, the second structure S2 makes it possible to place a hydraulic valve, a tube, an electric harness and other members (not shown) in the space (hollow portion) defined between the plates of the second structure S2. The hollow portion may be preferably made to have such a large dimension as to accommodate these members therein. Further, the second structure S2 may be configured by two plates, which is referred to as a double structure. Each of the two plates has a thickness t2 which is, for example, uniform in the second structure S2. For example, the thickness t2 is the same as the thickness t1. The distance between the two plates of the second structure S2 is greater than the thickness t2, such as, six times as great as the thickness t2.

(Arrangement of First Structure S1 and Second Structure S2)

The first structure S1 and the second structure S2 are arranged in such a manner that the distal side of the frame member 30 is lighter than the proximal side thereof in order to ensure the dynamic stiffness of the frame member 30. Specifically, the first structure S1 and the second structure S2 are arranged as follows.

The distal segment 33 has the first structure S1.

The proximal segment 31 has the second structure S2.

At least one of the proximal side sections of the left side segment 35L and the right side segment 35R has the second structure S2. The other portions (that do not have the second structure S2) of the left side segment 35L and the right side segment 35R have the first structure S1. The wording "the proximal side sections of the left side segment 35L and the right side segment 35R" means the proximal side sections of the left side segment 35L and the right side segment 35R that are located on the proximal side with respect to the respective lengthwise centers of the left side segment 35L and the right side segment 35R. In this configuration, it is appreciated that at least one of the proximal side sections of the left side segment 35L and the right side segment 35R has the second structure S2.

Additionally, it is preferable that the first structure S1 and the second structure S2 are arranged in the following manner.

The left side segment 35L has a boundary position 35La at which the left side segment 35L is divided into the proximal side section having the second structure S2 and the distal side section having the first structure S1. Specifically, the left side segment 35L includes a left side first structure portion 35L1 having the first structure S1 as the distal side section, and a left side second structure portion 35L2 having the second structure S2 as the proximal side section, via the boundary position 35La.

The right side segment 35R has a boundary position 35Ra at which the right side segment 35R is divided into the proximal side section having the second structure S2 and the distal side section having the first structure S1. Specifically, the right side segment 35R includes a right side first structure portion 35R1 having the first structure S1 as the distal side section, and a left side second structure portion 35R2 having the second structure S2 as the proximal side section, via the boundary position 35Ra.

As shown in FIG. 4, the portion of the left side segment 35L on which the driving device attachment member 23 is disposed has the second structure S2.

The proximal side section of the left side segment 35L is located on the proximal side with respect to the connecting segment 40, and has the second structure S2. The distal side section of the left side segment 35L is located on the distal side with respect to the connecting segment 40, and has the first structure S1. In this case, the boundary position 35La represents a connecting position between the connecting segment 40 and the left side segment 35L.

The proximal side section of the right side segment 35R is located on the proximal side with respect to the connecting segment 40, and has the second structure S2. The distal side section of the right side segment 35R is located on the distal side with respect to the connecting segment 40, and has the first structure S1. In this case, the boundary position 35Ra represents a connecting position between the connecting segment 40 and the right side segment 35R.

The connecting segment 40 (intermediate segment) is placed between the proximal segment 31 and the distal segment 33, and connects the right side segment 35R and the left side segment 35L with each other. The connecting segment 40 has a plate-like or substantially plate-like shape extending in the widthwise direction and the vertical direction. The connecting segment 40 is configured by a single plate. The connecting segment 40 may be configured by a plurality of plates which are arranged to define a space therebetween. The connecting segment 40 has a lateral dimension (thickness t3) which is greater than the thickness t1 of the plate of the first structure S1. The thickness t3 is also greater than the thickness t2 of the plate of the second structure S2. For example, the thickness t3 is twice as great as the thickness t1 and the thickness t2.

As shown in FIG. 3, the mount member is fixedly attached to the frame member 30, and the cabin 13 is mounted on the mount member (see FIG. 1). The mount member is fixedly held on the top of the frame member 30. In the present embodiment, the mount member includes a plurality of mounting portions 50, i.e. six mounting portions 50, fixedly held on the top of the frame member 30. The mounting portions 50 are respectively arranged in four corners of the frame member 30 and in the opposite connecting portions between the frame member 30 and the connecting segment 40 in a plan view. Each of the mounting portions 50 functions as a vibration absorber, and includes a mount rubber piece 51 and a mount rubber piece support 53.

As shown in FIG. 1, the mount rubber piece 51 comes into contact with the cabin 13 to thereby reduce vibration propagating between the frame member 30 and the cabin 13. For example, the mount rubber piece 51 shown in FIG. 3 is made of natural rubber and silicon oil.

The mount rubber piece support 53 fixedly supports (fastens) the mount rubber piece 51 by a bolt (not shown) or the like. The mount rubber piece support 53 is supported at an outer end thereof by the frame member 30 by being fixedly connected to the frame member 30. The mount rubber piece support 53 extends inward in a plan view. The mount rubber piece support 53 is configured by a single plate, and has a plate-like shape. The mount rubber piece support 53 includes an outwardly expanding part 53a.

The outwardly expanding part 53a has a shape whose dimension increases in the lengthwise direction or the widthwise direction as advancing toward the frame member 30 (toward the outer end of the mount rubber piece support 53). The outwardly expanding part 53a suppresses deformation occurring at the outer end of the mount rubber piece support 53. In this manner, it is possible to enhance the static stiffness of the mount rubber piece support 53 and the static stiffness of the cabin support deck 20.

(Comparison)

Figure 6:
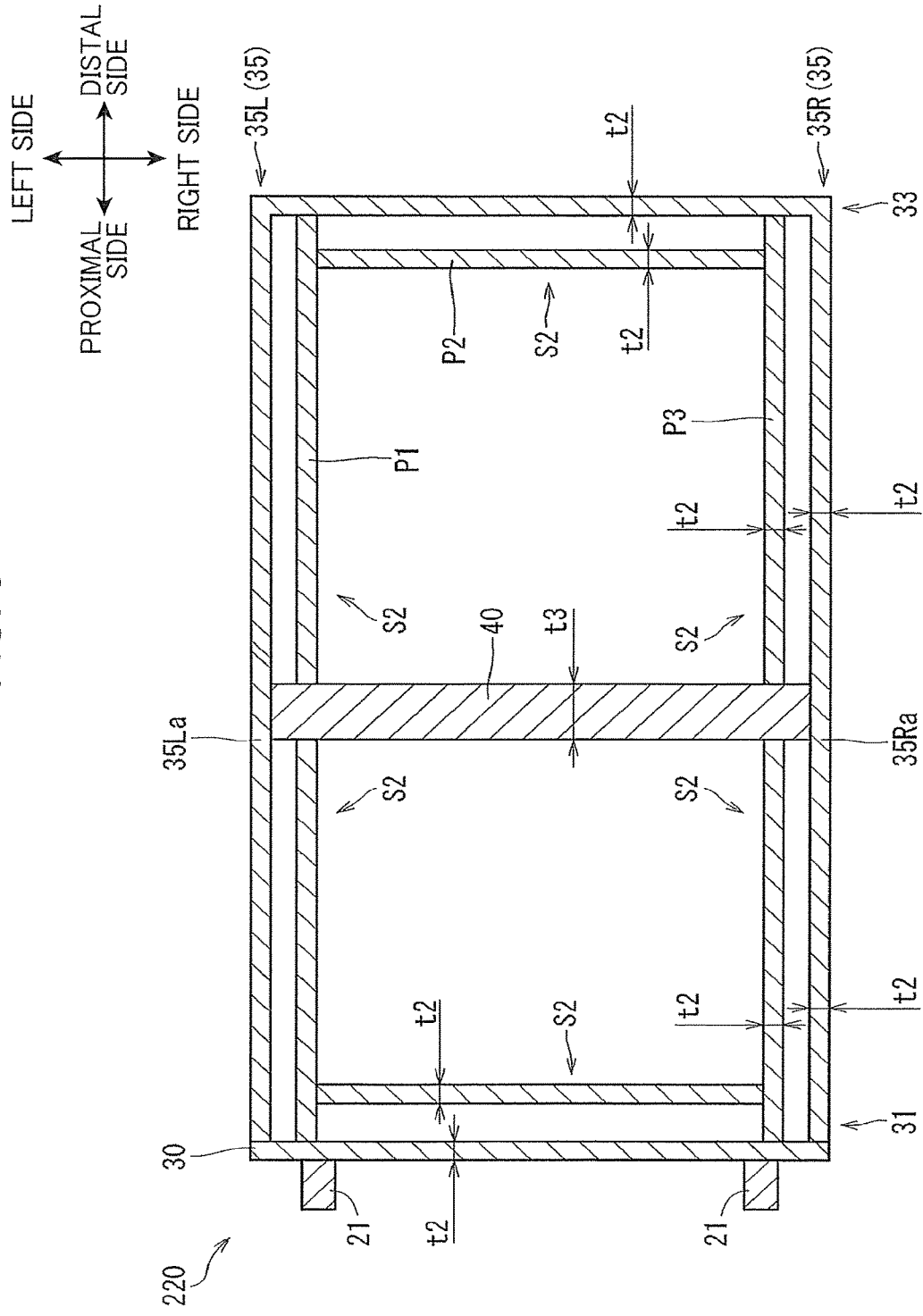
FIG. 6 is a cross section view showing a presumed comparative cabin support deck, similar to FIG. 4.

The frame member 30 including the double structure or the second structure in each of the proximal segment and respective proximal sections of the left and right side segments of the cabin support deck 20 according to the present embodiment and shown in FIG. 4 was compared with a frame member 30 including the double structure in each of four segments of a cabin support deck 220 shown in FIG. 6 as a comparative example. The frame member 30 of the present embodiment has the below-described configuration. The proximal area of the frame member 30 that is located on the proximal side with respect to the connecting segment 40 has the second structure S2, and the distal area of the frame member 30 that is located on the distal side with respect to the connecting segment 40 has the first structure S1. The plate of the first structure S1 has the thickness t1 of 6 mm. Each of the plates of the second structure S2 has the thickness t2 of 6 mm. The distance between the two plates of the second structure S2 is 36 mm which is six times as great as the thickness t2 (the lateral dimension T2 is 48 mm). The connecting segment 40 has the thickness t3 of 12 mm which is twice as great as the thickness t1 (=the thickness t2) of the frame member 30. The frame member 30 is symmetric with respect to the widthwisely center line of the cabin support deck 20.

The difference of the frame member 30 of the comparative example that is shown in FIG. 6 from the frame member 30 of the present embodiment will be described below. The frame member 30 of the comparative example has the double structure on each side thereof. A connecting segment 40 of the comparative example has the thickness t3 of 19 mm which is approximately three times as great as the thickness t2 of the frame member 30 of the comparative example. Also, the entire size of the frame member 30 of the comparative example is smaller than that of the frame member 30 of the present embodiment.

(Comparison Based on Dynamic Stiffness)

The dynamic stiffness of the frame member 30 of the present embodiment was compared with that of the frame member 30 of the comparative example at the "rigidity reduction rate". Specifically, their respective dynamic stiffnesses were compared in the following manner. For each of the present embodiment and the comparative example, prepared is an analytical model which includes a frame member 30, a spring as a mounting portion 50, and a weight point as a cabin 13. On the analytical model, a characteristic frequency f1 was obtained in the case that the frame member 30 was rigid, and a characteristic frequency f2 was obtained in the case that the frame member 30 was elastic. The characteristic frequency f1 indicates a characteristic vibration of a system consisting of the spring representing the mounting portion 50 and the weight point representing the cabin 13. The characteristic frequency f2 is a characteristic frequency of the system which varies as the gravity center position and the inertial moment of the cabin 13 vary. Hence, comparison is not made with respect to the characteristic frequency f2, but made with respect to the reduction rate of a characteristic frequency f2 to a characteristic frequency f1, i.e. rigidity reduction rate. Specifically, the rigidity reduction rate was calculated by the following equation:

$$\text{Rigidity Reduction Rate} = 100 \times (f1 - f2)/f1 \ [\%].$$

TABLE 1

| Vibration Mode | Rigidity Reduction Rate | |
|---|---|---|
| | Comparative Example (including Four Segments having Double Structure) | Present Embodiment (including Proximal Segment and Proximal Side Sections having Double Structure) |
| 1 | 12.12% | 9.17% |
| 2 | 23.56% | 18.22% |
| 3 | 23.90% | 22.19% |

As shown in Table 1, the rigidity reduction rates were calculated for three vibration modes. In the column "Vibration Mode" shown in Table 1, indicated at "1" is a vibration mode having a smallest characteristic frequency, indicated at "2" is another vibration mode having a secondary smallest characteristic frequency, and indicated at "3" is further another vibration mode having a thirdly smallest characteristic frequency. In all the vibration modes, the rigidity reduction rate of the present embodiment is smaller than that of the comparative example. The smaller rigidity reduction rate means a higher dynamic stiffness. Accordingly, it has been proved that the present embodiment can provide a higher dynamic stiffness than the comparative example. The mount rubber piece 51 can have a greater deformability against a vibration of the cabin 13 owing to the higher dynamic stiffness of the frame member 30. Therefore, the mount rubber piece 51 can efficiently exert a damping effect for the vibration of the cabin 13. In this manner, the vibration of the cabin 13 can be suppressed. As a result, the operator can feel more comfortable in the cabin 13.

(Comparison Based on Number of Components)

The number of plates constituting the frame member 30 of the comparative example is eleven, but the number of plates of the present embodiment is eight. Hence, three plates can be reduced in the present embodiment with relative to the comparative example. In other words, the present embodiment can eliminate the three plates denoted by P1, P2 and P3 shown in FIG. 6. The section of the left side segment 35L that constitutes a portion of the second structure S2 and the section of the left side segment 35L that constitutes the first structure S1 is on the single plate extending in the lengthwise direction. The right side segment 35R has the same configuration as the left side segment 35L. The configuration of the left and right side segments 35L and 35R can lead to the reduction in the number of components (the number of welding components) which are necessary to be jointed each other by welding. Accordingly, it is possible to decrease the preparatory assembling time and the welding amount, thus reducing the costs required for welding. Moreover, the reduced welding amount will suppress the strain caused by welding, and thus make the strain reduction operation or strain removal operation easier. Furthermore, the suppression of welding strain will bring about the following advantageous effect. A special jig has been conventionally used to fasten welding parts to keep the parts from being strained by the welding. When adopting this way, it is necessary to make such a special jig. In contrast, the suppression of welding strain can eliminate the necessity of a special jig, or can simplify the construction of a special jig even if it is necessary to make the special jig.

(Comparison Based on Weight)

The frame member 30 of the comparative example has a weight of 243 kg, a volume of 0.478 m$^3$, a unit weight of 509 kg/m$^3$. The frame member 30 of the present embodiment has a weight of 245 kg, a volume of 0.650 m$^3$, a unit weight of 377 kg/m$^3$. Hence, the frame member 30 of the present embodiment as shown in FIG. 4 is lighter by 26% in the unit weight than the frame member 30 of the comparative example as shown in FIG. 6.

(Comparison Result)

In the configuration where a frame member is supported onto the machine body only at a proximal end of the frame member as shown in FIG. 1, the heavier the distal end of the frame member is, the greater the inertial moment of the frame member, which thus lowers the dynamic stiffness of the frame member. The weight of the distal side area of the frame member of the present embodiment is made lighter than that of the frame member of the comparative example. Further, the frame member of the present embodiment has the higher dynamic stiffness than that of the comparative example. Accordingly, the frame member of the present embodiment is lighter and stiffer than that of the comparative example.

The above-described present embodiment of the cabin support deck 20 shown in FIG. 1 will be summarized below. The cabin support deck 20 shown in FIG. 1 supports the cabin 13 of the construction machine 1 on the underside of the cabin 13. As shown in FIG. 3, the cabin support deck 20 includes the frame member 30 and the mount member having the mounting portions 50. The frame member 30 is supported onto the machine body only at the proximal end of the frame member 30. The mount member is fixedly attached to the frame member 30, and the cabin 13 is supportively mounted on the mount portions 50 (see FIG. 1). The frame member 30 includes the proximal segment 31, the distal segment 33, the left side segment 35L, and the right side segment 35R. The distal segment 33 is arranged away from the proximal segment 31 on the distal side. The right side segment 35R and the left side segment 35L connect the proximal segment 31 and the distal segment 33 with each other, and face each other.

As shown in FIG. 4, the frame member 30 has the first structure S1 and the second structure S2. The lateral dimension T2 of the second structure S2 is greater than the lateral dimension (thickness t1) of the first structure S1.

The distal segment 33 has the first structure S1. The proximal segment 31 has the second structure S2. At least one of the proximal side sections of the left side segment 35L and the right side segment 35R has the second structure S2. The other portions (that do not have the second structure S2) of the left side segment 35L and the right side segment 35R have the first structure S1.

In this configuration, the first structure S1 is lighter than the second structure S2. The proximal side area of the frame member 30 has the second structure S2, and the distal side area of the frame member 30 has the first structure S1. Hence, the distal side area of the frame member 30 is lighter than the proximal side area thereof. Since the frame member 30 is supported onto the machine body only at the proximal end of the frame member 30, the lighter the distal side area of the frame member is, the higher the dynamic stiffness of the frame member 30 is. Accordingly, in the present embodiment, this configuration can ensure the dynamic stiffness of the cabin support deck 20 and reduce the weight thereof.

This configuration is, for example, particularly effective in the situation where the size of the cabin 13 is large. Specifically, in the case that the size of the cabin 13 is increased, it is necessary to increase the size of the cabin support deck 20 as well. This may cause a drastic increase in the weight of the cabin support deck 20. In this case, when the construction machine 1 is transported after disassembly thereof, there is a likelihood that the total weight of the components including the cabin support deck 20 may exceed a statutorily regulated transport weight. Hence, it is required to reduce the weight of the cabin support deck 20. Also, the cabin support deck 20 is to be supported onto the machine body only on the proximal side thereof. This support way may cause a problem that a simple weight reduction of the frame member 30 is likely to lead to a lack of necessary dynamic stiffness. In order to avoid this problem, the cabin support deck 20 of the present embodiment has the above-described configuration. In this manner, it is possible to ensure the dynamic stiffness of the cabin support deck 20 and reduce the weight thereof.

Further, as shown in FIG. 2, the cabin support deck 20 includes the driving device attachment member 23. The driving device attachment member 23 is connected with the driving device 17 driving the frame member 30 to pivot about the shaft 21a in the widthwise direction as shown in FIG. 1.

The driving device attachment member 23 is disposed on the proximal side section of the left side segment 35L.

As shown in FIG. 4, the portion of the left side segment 35L on which the driving device attachment member 23 is disposed has the second structure S2.

In this configuration, a pushing force of the driving device 17 shown in FIG. 2 is applied to the proximal side section of the left side segment 35L shown in FIG. 4 via the driving device attachment member 23. Hence, the cabin support deck 20 includes the left side segment 35L having the portion that has the aforementioned second structure S2. In this manner, it is possible to suppress the deformation of the left side segment 35L that is caused by the pushing force of the driving device 17 shown in FIG. 2.

Specifically, as shown in FIG. 2, an offset distance L is defined between an attachment position of the driving device 17 to the driving device attachment member 23 and the gravity center position of the cabin 13 in the widthwise direction. Hence, there is a higher likelihood that the left side segment 35L shown in FIG. 4 is twisted in this configuration than in a configuration having no offset distance L. In order to avoid the twist, the cabin support deck 20 includes the left side segment 35L having the portion that has the aforementioned second structure S2. Accordingly, it is possible to suppress the twist of the left side segment 35L.

Moreover, the right side segment 35R includes the right side second structure portion 35R2 having the second structure S2 and lying on the proximal side section of the right side segment 35R. The left side segment 35L includes the left side second structure portion 35L2 having the second structure S2 and lying on the proximal side section of the left side segment 35L.

This configuration can provide a higher dynamic stiffness of the cabin support deck 20 than a configuration where only one of the proximal side sections of the left side segment 35L and the right side segment 35R has the second structure S2.

Additionally, the cabin support deck 20 includes the connecting segment 40. The connecting segment 40 is placed between the distal segment 33 and the proximal segment 31, and connects the right side segment 35R and the left side segment 35L with each other.

This configuration can suppress the deformation of each of the left side segment 35L and the right side segment 35R more effectively than a configuration where the right side segment 35R and the left side segment 35L are not connected with each other via the connecting segment 40.

Besides, the proximal side sections of the left side segment 35L and the right side segment 35R are located on the proximal side with respect to the connecting segment 40, and have the second structure S2. The distal side sections of the left side segment 35L and the right side segment 35R are located on the distal side with respect to the connecting segment 40, and have the first structure S1.

This configuration can simplify the structure of the cabin support deck 20 in comparison with a configuration having the boundary positions 35La and 35Ra which are arranged on the proximal side or the distal side with respect to the connecting segment 40.

Furthermore, the connecting segment 40 has the lateral dimension (thickness t3) which is greater than the thickness t1 of the plate of the first structure S1 and the thickness t2 of the plate of the second structure S2.

This configuration can provide a higher static stiffness of the connecting segment 40 than a configuration where the connecting segment 40 has the lateral dimension (thickness t3) which is equal to or smaller than the thickness t1 or the thickness t2.

Furthermore, the first structure S1 includes a single plate.

This configuration can lead to the reduction in the number of components of the first structure S1 with relative to a configuration where the first structure S1 includes a plurality of plates which are arranged to define a space therebetween. The reduction in the number of components will facilitate the jointing, such as welding, between the components.

Also, the second structure S2 includes a plurality of plates which are arranged to define a space therebetween.

This configuration can provide a higher stiffness against the twist happening in the second structure S2 than a configuration where the second structures S2 includes a single plate. As a result, it is possible to enhance the dynamic stiffness of the cabin support deck 20.

In addition, as shown in FIG. 3, the mounting portion 50 includes the mount rubber piece 51, and the mount rubber piece support 53. The mount rubber piece 51 comes into contact with the cabin 13 as shown in FIG. 1. The mount rubber piece support 53 is fixedly connected to the frame member 30 for supporting the mount rubber piece 51.

The mount rubber piece support 53 includes a part (the outwardly expanding part 53a) having a shape whose dimension gradually increases in the lengthwise direction or the widthwise direction as advancing toward the frame member 30.

This configuration can provide a higher static stiffness of the mount rubber piece support 53 than a configuration where the mount rubber piece support 53 has no outwardly expanding part 53a. As a result, when the cabin 13 vibrates, the mount rubber piece 51 can efficiently exert the damping effect owing to the great deformability thereof, thereby absorbing the vibration of the cabin 13.

(Modifications)

The cabin support deck 20 of the present embodiment may be modified in various manners.

The connection of segments or parts may be made in a direct way or indirect way. One or more constituent elements of the cabin support deck 20 of the present embodiment may be omitted. For example, the connecting segment 40 may be omitted.

As shown in FIG. 2, the driving device attachment member 23 is arranged on the left side segment 35L in the present embodiment, but may be arranged on the right side segment 35R, if necessary. Alternatively, the driving device attachment member 23 may be arranged in a widthwise center of the cabin support deck 20. For example, the driving device attachment member 23 may be placed at a position where the offset distance L is zero.

Figure 5:
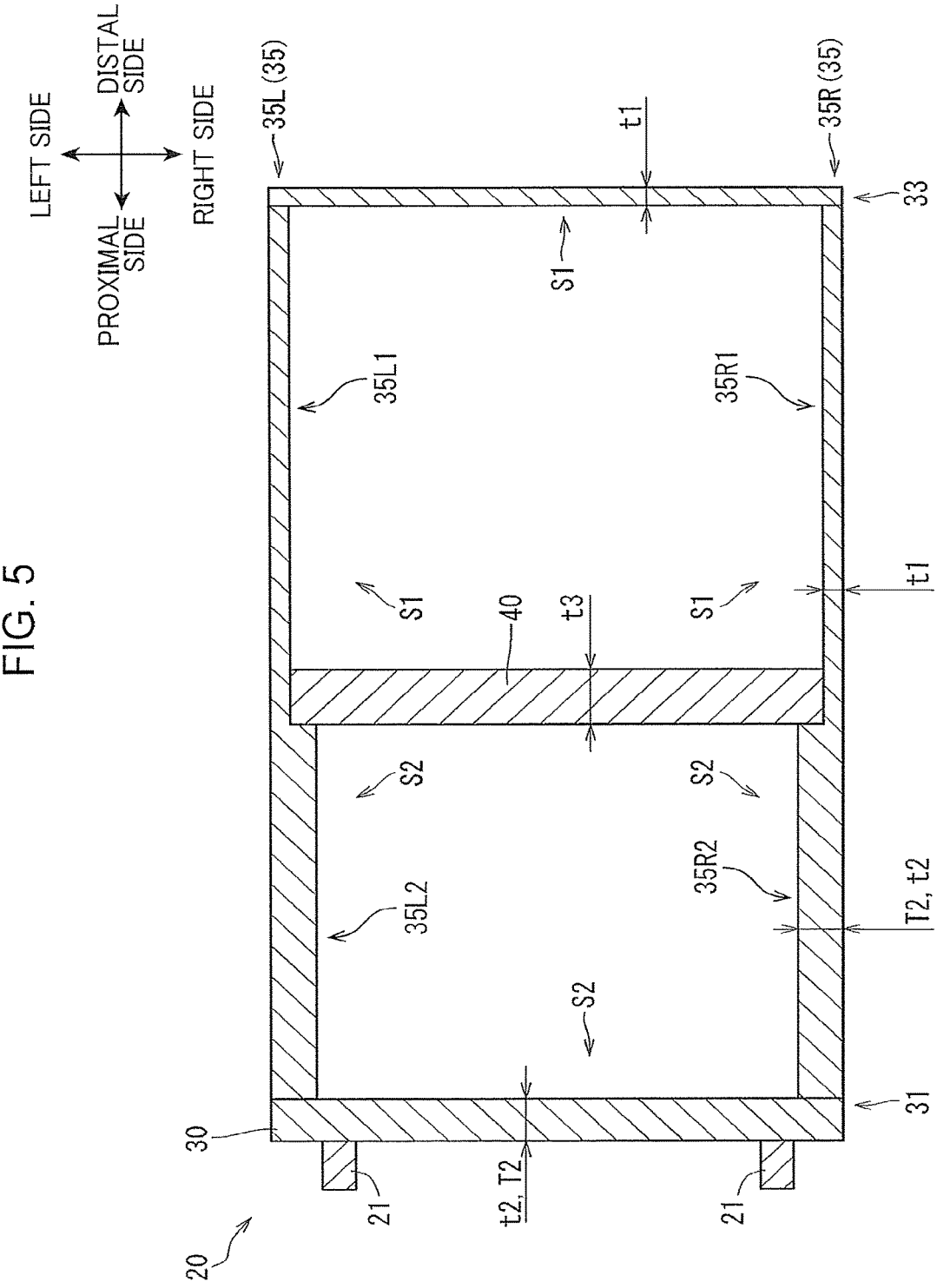
FIG. 5 is a cross sectional view showing a modified cabin support deck according to the embodiment of the present invention.

The first structure S1 and the second structure S2 shown in FIG. 4 may be modified in another manner. The first structure S1 may be configured by two or more plates arranged to define a space, or may have a hollow in a single plate. The second structure S2 may be configured by a single plate as shown in FIG. 5, or may be configured by three or more plates arranged to define a space between the opposite plates as a triple structure. For example, the first structure S1 may be the double structure and the second structure may be the triple structure. Also, as shown in FIG. 5, both the first structure S1, and the second structure S2 may be the single structure, but the second structure S2 has the thickness t2 greater than the thickness t1 of the first structure S1.

It may be appreciated to arrange different second structures S2 shown in FIG. 4 having different lateral dimensions T2. For example, the lateral dimension T2 of the proximal segment 31 may be made to be greater than the lateral dimension T2 of the left side second structure portion 35L2 and the right side second structure portion 35R2. Similarly, it may be appreciated to arrange different first structures S1 having different lateral dimensions (thickness t1 in the case of the single structure). In this case, the maximal lateral dimension (thickness t1) of the first structure S1 is smaller than the minimal lateral dimension T2 of the second structure S2.

The connecting segment 40 may be configured by two or more plates arranged to define a space therebetween. The boundary positions 35La and 35Ra may be arranged on the distal side or the proximal side with respect to the connecting segment 40.

In the aforementioned embodiment, the frame member 30 is supported onto the machine body at both the proximal side section of the left side segment 35L and the proximal segment 31. However, the frame member 30 may be supported onto the machine body at either the proximal side section of one of the left side segment 35L and the right side segment 35R, or the proximal segment 31.

Here, the embodiment will be briefly described below.

The cabin support deck of the embodiment represents a cabin support deck for supporting a cabin of a construction machine. The cabin support deck includes: a frame member including a proximal segment at which the frame member is supported, a distal segment arranged away from the proximal segment, a left side segment which connects a left end of the proximal segment and a left end of the distal segment with each other, and has a proximal side section and a distal side section, and a right side segment which connects a right end of the proximal segment and a right end of the distal segment with each other, and has a proximal side section and a distal side section: and a mounting portion fixedly attached to the frame member, and on which the cabin is to be mounted, wherein the distal segment has a first structure having a first lateral dimension, the proximal segment has a second structure having a second lateral dimension which is greater than the first lateral dimension, and one of the proximal side sections of the left side segment and the right side segment has the second structure, and the other portions including the distal side sections of the left side segment and the right side segment have the first structure.

It is preferable that the cabin support deck further includes a driving device attachment member to which a driving device driving the frame member to pivot about an axis in a right-left direction is to be attached, the driving device attachment member being disposed on a portion of the one of the proximal side sections of the left side segment and the right side segment that has the second structure.

In the cabin support deck, it is preferable that the left side segment includes a left side first structure portion having the first structure, and a left side second structure portion having the second structure, the left side second structure portion lying on the proximal side section of the left side segment, and the right side segment includes a right side first structure portion having the first structure, and a right side second structure portion having the second structure, the right side second structure portion lying on the proximal side section of the right side segment.

In the cabin support deck, it is preferable that a connecting segment is placed between the distal segment and the proximal segment, and connects the left side segment and the right side segment with each other.

In the cabin support deck, it is preferable that the proximal side section of each of the left side segment and the right side segment is located on a proximal side with respect to the connecting segment, and the distal side section of each of the left side segment and the right side segment is located on a distal side with respect to the connecting segment.

In the cabin support deck, it is preferable that the proximal side section of each of the left side segment and the right side segment has the second structure, and the distal side section of each of the left side segment and the right side segment has the first structure.

In the cabin support deck, it is preferable that the first structure includes a single plate, the second structure includes at least one plate, and the connecting segment has a thickness greater than a thickness of the plate of the first structure and a thickness of the plate of the second structure.

In the cabin support deck, it is preferable that the first structure includes a single plate.

In the cabin support deck, it is preferable that the second structure includes a plurality of plates which are arranged to define a space therebetween.

In the cabin support deck, it is preferable that the mounting portion includes: a mount rubber piece to come into contact with the cabin; and a mount rubber piece support fixedly connected to the frame member for supporting the mount rubber piece, the mount rubber piece support including a part having a shape whose dimension gradually increases in the right-left direction or a lengthwise direction connecting the distal segment and the proximal segment as advancing toward the frame member.

This application is based on Japanese Patent application No. 2016-032179 filed in Japan Patent Office on Feb. 23, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A cabin support deck for supporting a cabin of a construction machine, comprising:
   a frame member including
      a proximal segment at which the frame member is supported,
      a distal segment arranged away from the proximal segment,
      a left side segment which connects a left end of the proximal segment and a left end of the distal segment with each other, and has a proximal side section and a distal side section, and
      a right side segment which connects a right end of the proximal segment and a right end of the distal segment with each other, and has a proximal side section and a distal side section: and
   a mounting portion fixedly attached to the frame member, and on which the cabin is to be mounted, wherein
   the distal segment has a first structure having a first lateral dimension,
   the proximal segment has a second structure having a second lateral dimension which is greater than the first lateral dimension, and
   at least one of the proximal side sections of the left side segment and the right side segment has the second structure, and the other portions including the distal side sections of the left side segment and the right side segment have the first structure.

2. The cabin support deck according to claim 1, further comprising:
a driving device attachment member to which a driving device driving the frame member to pivot about an axis in a right-left direction is to be attached,
the driving device attachment member being disposed on a portion of the one of the proximal side sections of the left side segment and the right side segment that has the second structure.

3. The cabin support deck according to claim 1, wherein the left side segment includes a left side first structure portion having the first structure, and a left side second structure portion having the second structure, the left side second structure portion lying on the proximal side section of the left side segment, and
the right side segment includes a right side first structure portion having the first structure, and a right side second structure portion having the second structure, the right side second structure portion lying on the proximal side section of the right side segment.

4. The cabin support deck according to claim 1, further comprising:
a connecting segment placed between the distal segment and the proximal segment, and connecting the left side segment and the right side segment with each other.

5. The cabin support deck according to claim 4, wherein the proximal side section of each of the left side segment and the right side segment is located on a proximal side with respect to the connecting segment, and
the distal side section of each of the left side segment and the right side segment is located on a distal side with respect to the connecting segment.

6. The cabin support deck according to claim 5, wherein the proximal side section of each of the left side segment and the right side segment has the second structure, and
the distal side section of each of the left side segment and the right side segment has the first structure.

7. The cabin support deck according to claim 4, wherein the first structure includes a single plate,
the second structure includes at least one plate, and
the connecting segment has a thickness greater than a thickness of the plate of the first structure and a thickness of the plate of the second structure.

8. The cabin support deck according to claim 1, wherein the first structure includes a single plate.

9. The cabin support deck according to claim 1, wherein the second structure includes a plurality of plates which are arranged to define a space therebetween.

10. The cabin support deck according to claim 1, wherein the mounting portion includes:
a mount rubber piece to come into contact with the cabin; and
a mount rubber piece support fixedly connected to the frame member for supporting the mount rubber piece,
the mount rubber piece support including a part having a shape whose dimension gradually increases in the right-left direction or a lengthwise direction connecting the distal segment and the proximal segment as advancing toward the frame member.

* * * * *